(12) United States Patent
Kim et al.

(10) Patent No.: US 10,860,321 B2
(45) Date of Patent: Dec. 8, 2020

(54) ELECTRONIC DEVICE AND METHOD FOR PROCESSING INSTRUCTION USING THE SAME

(71) Applicant: SAMSUNG ELECTRONICS CO., LTD., Suwon-si (KR)

(72) Inventors: Hwee Soo Kim, Suwon-si (KR); Hyuk Min Kwon, Yongin-si (KR); Won Jin Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 85 days.

(21) Appl. No.: 16/205,297

(22) Filed: Nov. 30, 2018

(65) Prior Publication Data
US 2019/0171456 A1    Jun. 6, 2019

(30) Foreign Application Priority Data
Dec. 5, 2017   (KR) .......................... 10-2017-0165725

(51) Int. Cl.
*G06F 9/30* (2018.01)
*G06F 9/38* (2018.01)
*G06F 15/82* (2006.01)

(52) U.S. Cl.
CPC ........ *G06F 9/30101* (2013.01); *G06F 9/3016* (2013.01); *G06F 9/3802* (2013.01); *G06F 15/82* (2013.01)

(58) Field of Classification Search
None
See application file for complete search history.

(56) References Cited

U.S. PATENT DOCUMENTS

| | | | |
|---|---|---|---|
| 7,409,530 B2 * | 8/2008 | Kim ...................... | G06F 9/3891 712/24 |
| 7,418,580 B1 * | 8/2008 | Campbell ........... | G06F 9/30174 712/227 |
| 7,774,581 B2 * | 8/2010 | Baek .................... | G06F 9/30156 712/204 |
| 8,799,882 B2 | 8/2014 | Tarditi, Jr. et al. | |

FOREIGN PATENT DOCUMENTS

| | | |
|---|---|---|
| JP | 4979875 B2 | 4/2012 |
| JP | 2015-069453 A | 4/2015 |
| KR | 10-1118593 B1 | 2/2012 |

\* cited by examiner

*Primary Examiner* — Eric Coleman
(74) *Attorney, Agent, or Firm* — Volentine, Whitt & Francos, PLLC

(57) ABSTRACT

An electronic device including a memory; and a processor configured to generate an instruction code based on a same opcode when the same opcode is used in one or more slots defined in the memory upon application compiling.

18 Claims, 9 Drawing Sheets

⟨550⟩

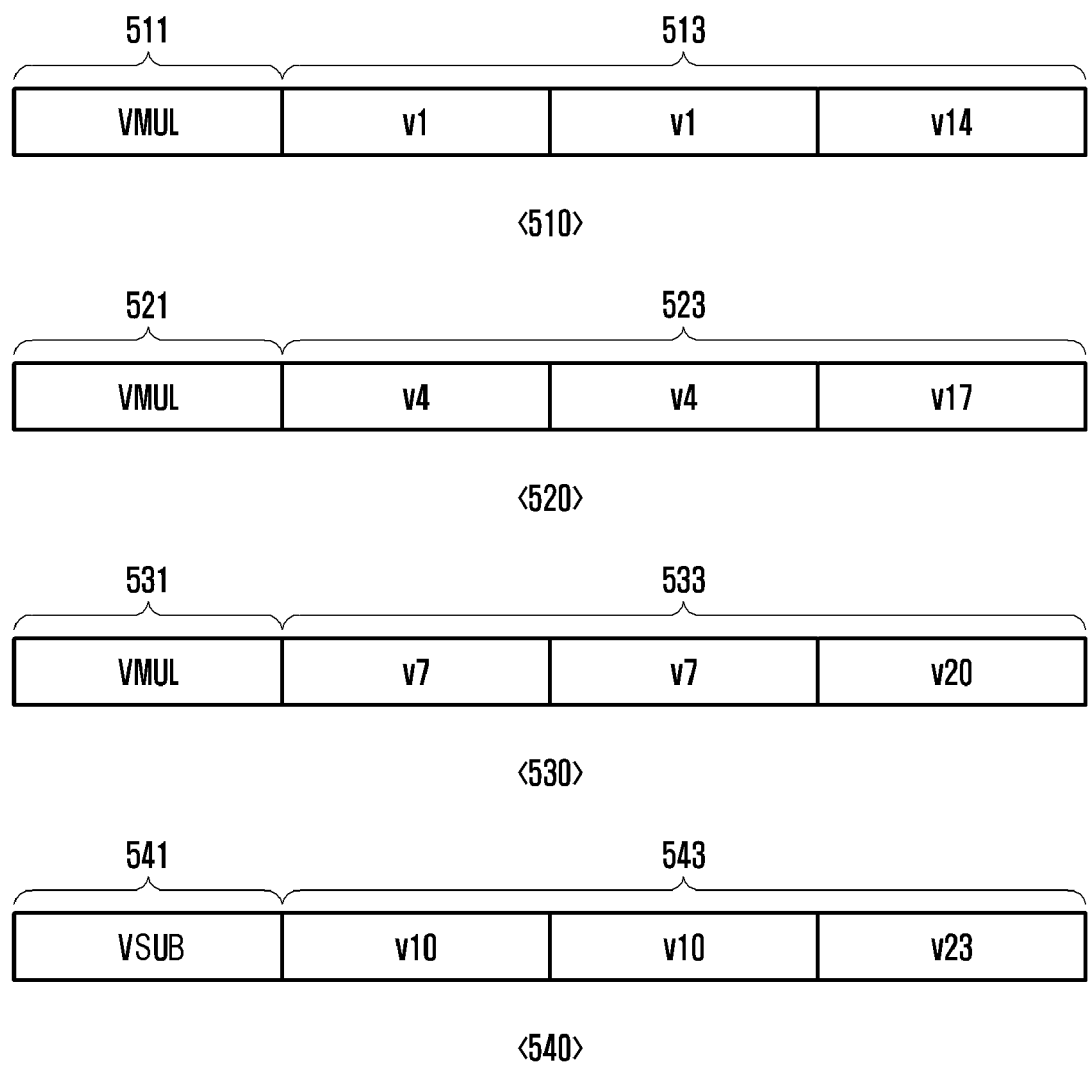

⟨550⟩

ELECTRONIC DEVICE AND METHOD FOR PROCESSING INSTRUCTION USING THE SAME

CROSS-REFERENCE TO RELATED APPLICATION

A claim of priority is made to Korean Patent Application No. 10-2017-0165725 filed on Dec. 5, 2017 in the Korean Intellectual Property Office, the entire contents of which are hereby incorporated by reference.

BACKGROUND

The present inventive concepts relate to an electronic device and a method of processing an instruction using the electronic device, and more particularly to a method of processing an instruction to be executed by a very long instruction word (VLIW) processor.

Generally, very long instruction word (VLIW) processors may be used in digital signal processors (DSPs) that process regular operations such as fast Fourier transform (FFT), digital filtering, and the like. For example, VLIW processors may place a plurality of operations in one long instruction and perform instruction level parallelism (ILP) on the instruction. Such VLIW processors may be used in applications such as for example multimedia and mobile communications which require improved performance and fast processing time, because VLIW processors can process a plurality of instructions per each cycle.

A VLIW architecture is a processor architecture that is frequently used in embedded systems, and program code size is an important consideration in embedded systems. As the program code size increases, the number of times instructions are fetched increases. As a result, cache miss rate consequently increases, degrading processor performance.

SUMMARY

An electronic device according to various embodiments of the inventive concepts generates a new VLIW instruction to reduce redundancy of the same opcode when the same opcode is used in two or more slots in a VLIW processor.

Embodiments of the inventive concepts provide an electronic device including a memory; and a processor configured to determine whether two or more slots of an execution unit of an instruction configured according to an instruction set architecture (ISA) have a same first opcode upon application compiling, and when the two or more slots have the same first opcode the processor is further configured to generate an instruction code composed of the same first opcode and register index fields of one of the slots having the same first opcode, at least one register index field of at least one of the slots having the same first opcode other than the one of the slots, and state bits.

Embodiments of the inventive concepts further provide a method of processing an instruction of an electronic device, the electronic device including a memory and a processor. The method includes determining by the processor whether two or more slots of an execution unit of an instruction configured according to an instruction set architecture (ISA) stored in the memory have a same first opcode upon application compiling; and when the two or more slots have the same first opcode, generating by the processor an instruction code composed of the same first opcode and register index fields of one of the slots having the same first opcode, at least one register index field of at least one of the slots having the same first opcode other than the one slot, and state bits.

Embodiments of the inventive concepts still further provide an electronic device including a memory configured to store an instruction set architecture (ISA); and a processor configured to determine whether two or more slots of an execution unit of an instruction configured according to the instruction set architecture (ISA) have a same first opcode upon application compiling, wherein each of the slots comprise an opcode field and register index fields, and when the two or more slots have the same first opcode, the processor is further configured to generate an instruction code including a single occurrence of the same first opcode, the register index fields of the two or more slots, and state bits.

BRIEF DESCRIPTION OF THE DRAWINGS

The above and other aspects and features of the inventive concepts will become more apparent in detail exemplary embodiments thereof with reference to the attached drawings, in which:

FIG. 5A illustrates a diagram descriptive of a method of generating and decoding an instruction code according to embodiments of the inventive concepts.

DETAILED DESCRIPTION

Hereinafter, example embodiments of the inventive concepts will be described with reference to the accompanying drawings.

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

Figure 1:
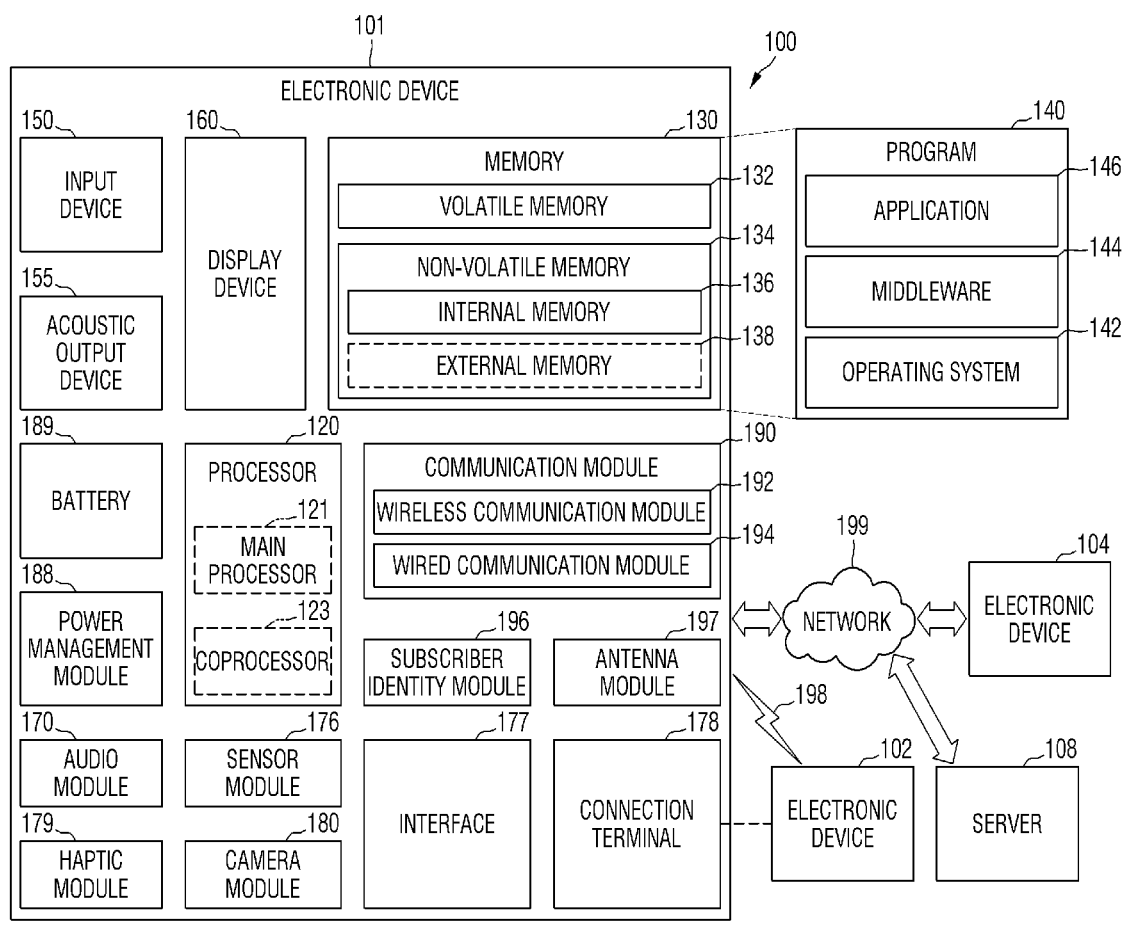
FIG. 1 illustrates a block diagram of an electronic device in a network environment according to embodiments of the inventive concepts.

FIG. 1 illustrates a block diagram of an electronic device 101 in a network environment 100 according to embodiments of the inventive concepts.

Referring to FIG. 1, in the network environment 100, the electronic device 101 may communicate with an electronic device 102 over a first network 198 (e.g., short-range wireless communication) or may communicate with an electronic device 104 or a server 108 over a second network 199 (e.g., long-range wireless communication). According to an embodiment, the electronic device 101 may communicate with the electronic device 104 via the server 108. According to an embodiment, the electronic device 101 may include a processor 120, a memory 130, an input device 150, an acoustic output device 155, a display device 160, an audio module 170, a sensor module 176, an interface 177, a connection terminal 178, a haptic module 179, a camera module 180, a power management module 188, a battery 189, a communication module 190, a subscriber identifying module 196, and an antenna module 197. In some embodiments, at least one of the components (e.g., the display device 160 or the camera module 180) may be excluded from the electronic device 101 or another component may be additionally included in the electronic device 101. In some embodiments, some components may be integrated with other components. For example, the sensor module 176 (e.g., a fingerprint sensor, an iris sensor, or an illumination sensor) may be embedded in the display device 160 (e.g., a display).

For example, by executing software (e.g., a program 140), the processor 120 may control at least another component (e.g., a hardware or software component) of the electronic device 101 connected to the processor 120 and may process, and perform operations on, various pieces of data. The processor 120 may load instructions or data received from another component (e.g., the sensor module 176 or the communication module 190) into a volatile memory 132, process the loaded instructions or data, and store result data in a non-volatile memory 134. According to an embodiment, the processor 120 may include a main processor 121 (e.g., a central processing unit or an application processor) and a coprocessor 123 (e.g., a graphics processing unit, an image signal processor, a sensor hub processor, or a communications processor) that is operated independently of the main processor 121 and that is additionally or alternatively configured to use lower power than the main processor 121 or specialized for a specified function. Here, the coprocessor 123 may be operated separately from the main processor 121 or while embedded in the main processor 121.

In this case, on behalf of the main processor 121 while the main processor 121 is in an inactive (e.g., sleep) state, or together with the main processor 121 while the main processor 121 is in an active (e.g., application-in-execution) state, the coprocessor 123 may control at least some functions or states associated with at least one (e.g., the display device 160, the sensor module 176, or the communication module 190) of the components of the electronic device 101. According to an embodiment, the coprocessor 123 (e.g., an image signal processor or a communications processor) may be implemented as a portion of another component (e.g., the camera module 180 or the communication module 190) that is functionally associated with the coprocessor 123. The memory 130 may store various pieces of data used by at least one component (e.g., the processor 120 or the sensor module 176) of the electronic device 101, such as software (e.g., the program 140) and input data or output data for an associated command. The memory 130 may include the volatile memory 132 or the non-volatile memory 134. The non-volatile memory 134 may include internal memory 136 and external memory 138. The internal memory 136 may include for example read-only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), ferroelectric RAM (FRAM), and the like. The external memory 138 may be removably connectable to the electronic device 101 and may include for example a personal computer memory card international association (PCMCIA) card, a compact flash card (CF), smart media cards (SM and SMC), a memory stick, a multimedia card (MMC, RS-MMC, and MMCmicro), a secure digital (SD) card (SD, miniSD, microSD, and SDHC), a universal serial bus (USB) memory card, and a universal flash storage (UFS) or the like.

The program 140 is software stored in the memory 130 and may include, for example, an operating system 142, middleware 144, or an application 146.

The input device 150 is a device for receiving commands or data to be used by a component (e.g., the processor 120) of the electronic device 101 from the outside (e.g., a user) of the electronic device 101 and may include, for example, a microphone, a mouse, or a keyboard, among other various types of input devices.

The acoustic output device 155 is a device for outputting an acoustic signal to the outside of the electronic device 101 and may include, for example, a speaker for general use such as multimedia playback or recording playback and a receiver for call reception only. According to an embodiment, the receiver may be formed integrally with or separately from the speaker.

The display device 160 is a device for visually providing information to the user of the electronic device 101 and may include, for example, a display, a hologram device, or a projector, and a control circuit for controlling a corresponding device. According to an embodiment, the display device 160 may include touch circuitry or a pressure sensor capable of measuring touch pressure intensity.

The audio module 170 may perform bidirectional conversion between sound and electric signals. According to an embodiment, the audio module 170 may acquire sound through the input device 150 or output sound through the acoustic output device 155 or an external electronic device (e.g., the electronic device 102, such as a speaker or a headphone) connected to the electronic device 101 in a wired or wireless manner.

The sensor module 176 may generate electric signals or data values corresponding to external environment states or internal operating states (e.g., power or temperatures) of the electronic device 101. The sensor module 176 may include, for example, a gesture sensor, a gyro sensor, an air pressure sensor, a magnetic sensor, an acceleration sensor, a grip sensor, a proximity sensor, a color sensor, an infrared (IR) sensor, a biosensor, a temperature sensor, a humidity sensor, or an illumination sensor.

The interface 177 may support a specified protocol for connecting to an external electronic device (e.g., the electronic device 102) in a wired or wireless manner According to an embodiment, the interface 177 may include a high definition multimedia interface (HDMI™), a universal serial bus (USB) interface, a Secure Digital (SD) card interface, or an audio interface.

A connection terminal 178 may include a connector, such as an HDMI connector, a USB connector, an SD card connector, or an audio connector (e.g., a headphone connector), which can physically connect the electronic device 101 and an external electronic device (e.g., the electronic device 102).

The haptic module 179 may convert an electrical signal into a mechanical stimulus (e.g., vibration or movement) or an electrical stimulus that the user may perceive through a tactile or kinesthetic sense. The haptic module 179 may include, for example, a motor, a piezoelectric element, or an electrical stimulation device.

The camera module 180 may capture still images and videos. According to an embodiment, the camera module 180 may include one or more lenses, an image sensor, an image signal processor, or a flash.

The power management module 188 is a module for managing power supplied to the electronic device 101 and may be configured, for example, as at least a portion of a power management integrated circuit (PMIC).

The battery 189 is a device for supplying power to at least one component of the electronic device 101 and may include, for example, a non-rechargeable primary battery, a rechargeable secondary battery, or a fuel cell.

The communication module 190 may establish a wired or wireless communication channel between the electronic device 101 and an external electronic device (e.g., the electronic device 102, the electronic device 104, or the server 108) and support communication through the established communication channel. The communication module 190 may include one or more communication processors that are operated independently of the processor 120 (e.g., an application processor) and that support wired communication or wireless communication. According to an embodiment, the communication module 190 may include a wireless communication module 192 (e.g., a cellular communication module, a short range wireless communication module, or a global navigation satellite system (GNSS) communication module) or a wired communication module 194 (e.g., a local area network (LAN) communication module, or a power line communication module). Among the above communication modules, a corresponding communication module may be used to communicate with an external electronic device through a first network 198 (e.g., a short range communication network such as Bluetooth, WiFi direct, or Infrared Data Association (IrDA)) or a second network 199 (e.g., a long range communication network such as a cellular network, the Internet, or a computer network (e.g., a local area network (LAN) or a wide area network (WAN))). The above-described various kinds of communication modules 190 may be implemented as a single chip or separate individual chips.

According to an embodiment, the wireless communication module 192 may identify and authenticate the electronic device 101 in a communication network by using user information stored in the subscriber identity module 196.

The subscriber identity module 196 may include a memory for storing the user information.

The antenna module 197 may include one or more antennas for externally transmitting or receiving signals or power. According to an embodiment, the communication module 190 (e.g., the wireless communication module 192) may transmit or receive signals to or from an external electronic device through an antenna suitable for a communication scheme.

Some of the above described elements of shown in FIG. 1 may be connected to each other via a communication scheme (e.g., a bus, a general purpose input/output (GPIO), a serial peripheral interface (SPI), or a mobile industry processor interface (MIPI®) between peripherals) that is not shown, to exchange signals (e.g., commands or data) between each other.

According to an embodiment, the commands or data may be transmitted or received between the electronic device 101 and the external electronic device 104 through the server 108 connected to the second network 199. Each of the electronic devices 102 and 104 may be the same or a different type of device as or from the electronic device 101. According to an embodiment, some or all actions that are executed by the electronic device 101 may be executed by another external electronic device or a plurality of external electronic devices. According to an embodiment, when the electronic device 101 should perform a certain function or service automatically or upon request, the electronic device 101 may request a function that is at least partially associated with the certain function or service from an external electronic device, instead of or in addition to autonomously running the function or service. When the request is received, the external electronic device may execute the requested function or an additional function and deliver a result of the execution to the electronic device 101. The electronic device 101 may provide the requested function or service by using as is or after additionally processing the received result. To this end, for example, cloud computing, distributed computing, or client-server computing technology may be used.

In embodiments, the electronic device 101 may be for example a personal computer, a server, a workstation, a notebook, a tablet, a mobile device, a smartphone, or the like.

Figure 2:
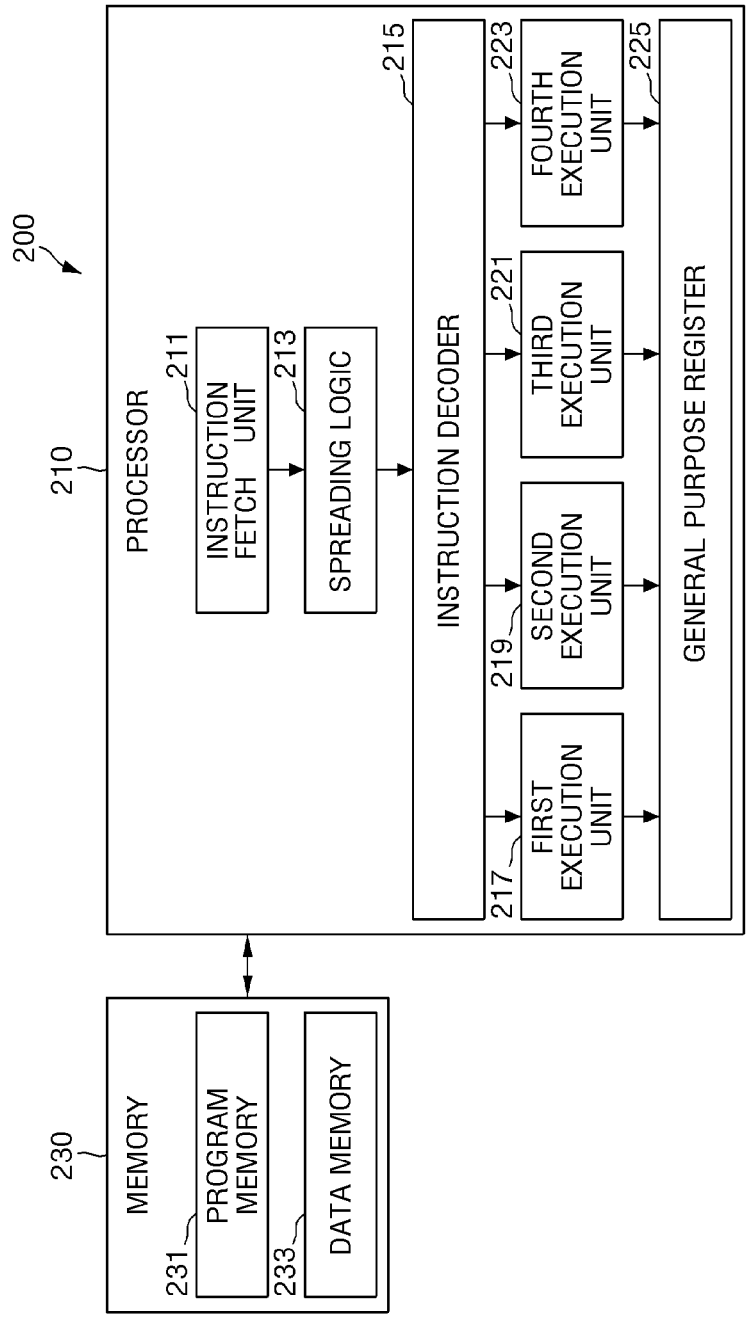
FIG. 2 illustrates a block diagram showing an electronic device for processing instructions according to embodiments of the inventive concepts.

FIG. 2 illustrates a block diagram showing an electronic device for processing instructions according to embodiments of the inventive concepts.

Referring to FIG. 2, an electronic device 200 (e.g., the electronic device 101 of FIG. 1) may include a processor 210 (e.g., the processor 120 of FIG. 1) and a memory 230 (e.g., the memory 130 of FIG. 1), among other various components/circuits (not shown).

According to various embodiment of the inventive concepts, the processor 210 (e.g., the processor 120 of FIG. 1) may control overall operation of the electronic device 200 and a signal flow between internal components, may perform data processing, and may control power supplied to the components from a battery (e.g., the battery 189 of FIG. 1).

In an embodiment, the processor 210 may be a very long instruction word (VLIW) processor. For example, as a VLIW processor, the processor 210 may be responsive to programs that explicitly specify instructions to execute in parallel.

In an embodiment, the processor 210 may include an instruction fetch unit 211, spreading logic (unit) 213, an instruction decoder 215, a first execution unit 217, a second execution unit 219, a third execution unit 221 and a fourth execution unit 223 (which execution units may hereinafter be referred to as first to fourth execution units 217 to 223), and a general purpose register 225.

In an embodiment, the instruction fetch unit 211 may fetch an instruction code from a program memory 231.

In an embodiment, the spreading logic 213 checks state bits of the instruction code fetched by the instruction fetch unit 211. The state bits may be composed of a field for determining whether the fetched instruction code is a new instruction code, and a field indicating whether an opcode(s) constituting (or set for) the fetched instruction code is the same as opcodes of at least one register index field of the fetched instruction code. The spreading logic 213 may determine whether the fetched instruction code is a new instruction code on the basis of the field of the state bits for determining whether the fetched instruction is a new instruction code.

In an embodiment, when the fetched instruction code is determined as a new instruction code, the spreading logic 213 checks the state bits of the field indicating whether the opcode(s) constituting or set for the fetched instruction code is the same as the opcodes of at least one register index field of the fetched instruction code. By checking these state bits indicating whether the opcode constituting or set for the fetched instruction code is the same as opcodes of at least one register field of the fetched instruction code, the spreading logic 213 may spread the opcode constituting or set for the fetched instruction code into slots in which a value of the respective state bits corresponding to the at least one register index field is activated.

The spreading logic 213 of the processor 210 may be performed by any suitable means capable of performing the aforementioned operations, such as various hardware and/or software component(s), circuits and/or modules. For example, functions described in connection with the spreading logic 213 may be directly embodied in hardware, in a software module executed by a processor, or in a combination of the two. If implemented in software, the functions may be stored on or transmitted over as one or more instructions or code on a tangible, non-transitory computer-readable medium. A software module may for example reside in random access memory (RAM), flash memory, read only memory (ROM), electrically programmable ROM (EPROM), electrically erasable programmable ROM (EEPROM), registers, hard disk, a removable disk, a CD ROM, or any other form of storage medium known in the art.

In an embodiment, the instruction decoder 215 delivers the opcodes spread by the spreading logic 213 to the first to fourth execution units 217 to 223 corresponding to the corresponding register index fields.

In an embodiment, each of the first to fourth execution units 217 to 223 decodes corresponding instructions on the basis of the opcodes received from the instruction decoder 215.

In an embodiment, the general purpose register 225 stores data such as operational processing, operational results, and return addresses.

According to various embodiments of the inventive concepts, the memory 230 (e.g., the memory 130 of FIG. 1) may be electrically connected to the processor 210.

In an embodiment, the memory 230 may include a program memory 231 and a data memory 233.

In an embodiment, the program memory 231 may store a new instruction code generated by the processor 210, the new instruction code having the same opcode in one or more slots constituting an instruction set architecture (ISA) upon application compiling. The same opcode may correspond to the opcode constituting or set for the fetched instruction code as previously described.

In an embodiment, the data memory 233 may store an ISA encoding map for generating an instruction code (e.g., a new VLIW instruction code). The ISA encoding map may define an instruction architecture for each instruction. The instruction architecture may include opcodes, two operand register indices, and a register index for storing result values.

Figure 3:
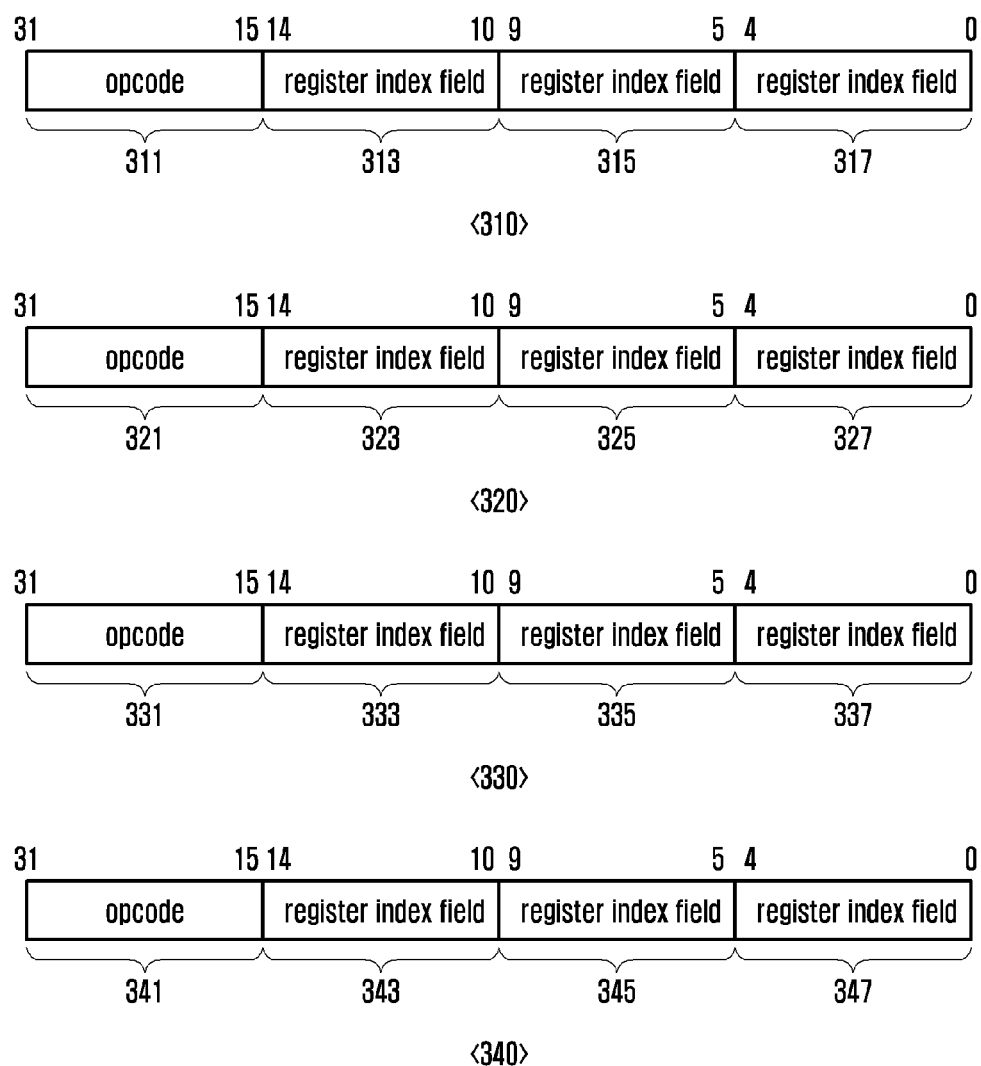
FIG. 3 illustrates a diagram showing a configuration of an execution unit for processing an instruction according to embodiments of the inventive concepts.

FIG. 3 illustrates a diagram showing a configuration of an execution unit for processing an instruction according to embodiments of the inventive concepts.

In an embodiment, a processor (e.g., the processor 210 of FIG. 2) includes a VLIW processor. In an embodiment, an ISA for recognizing and processing instructions through a processor may consist of four slots 310, 320, 330, and 340. Each of the slots 310, 320, 330, and 340 constituting the ISA may include opcodes, two operand register indices, and a register index for storing result values. However, the inventive concepts are not limited thereto, and elements constituting each slot may vary depending on the type of instruction.

In an embodiment, each of the four slots 310, 320, 330, and 340 constituting the ISA may consist of 32 bits. When an instruction uses all of the four slots, a 128-bit program memory (e.g., the program memory 231 of FIG. 2) may be used. For example, the first slot 310 may consist of a total of 32 bits, i.e., may include opcodes 311, which consist of 17 bits, and register index fields 313, 315 and 317, each of which consists of 5 bits. Also, the second slot 320 may consist of a total of 32 bits, i.e., may include opcodes 321, which consist of 17 bits, and register index fields 323, 325 and 327, each of which consists of 5 bits. Also, the third slot 330 and the fourth slot 340 may be configured as having the same format as those of the first slot 310 and the second slot 320.

In an embodiment, when two or more of the four slots have the same opcodes, the processor (e.g., processor 210 of FIG. 2) may generate a new instruction code in a form in which one of the slots having the same opcode consists of 32 bits (e.g., an opcode field and a register index field), and at least one of the slots other than the one slot consists of at least one register index field other than fields of the same opcodes.

This will be described in detail with reference to FIGS. 4A to 5B.

Figure 4A:
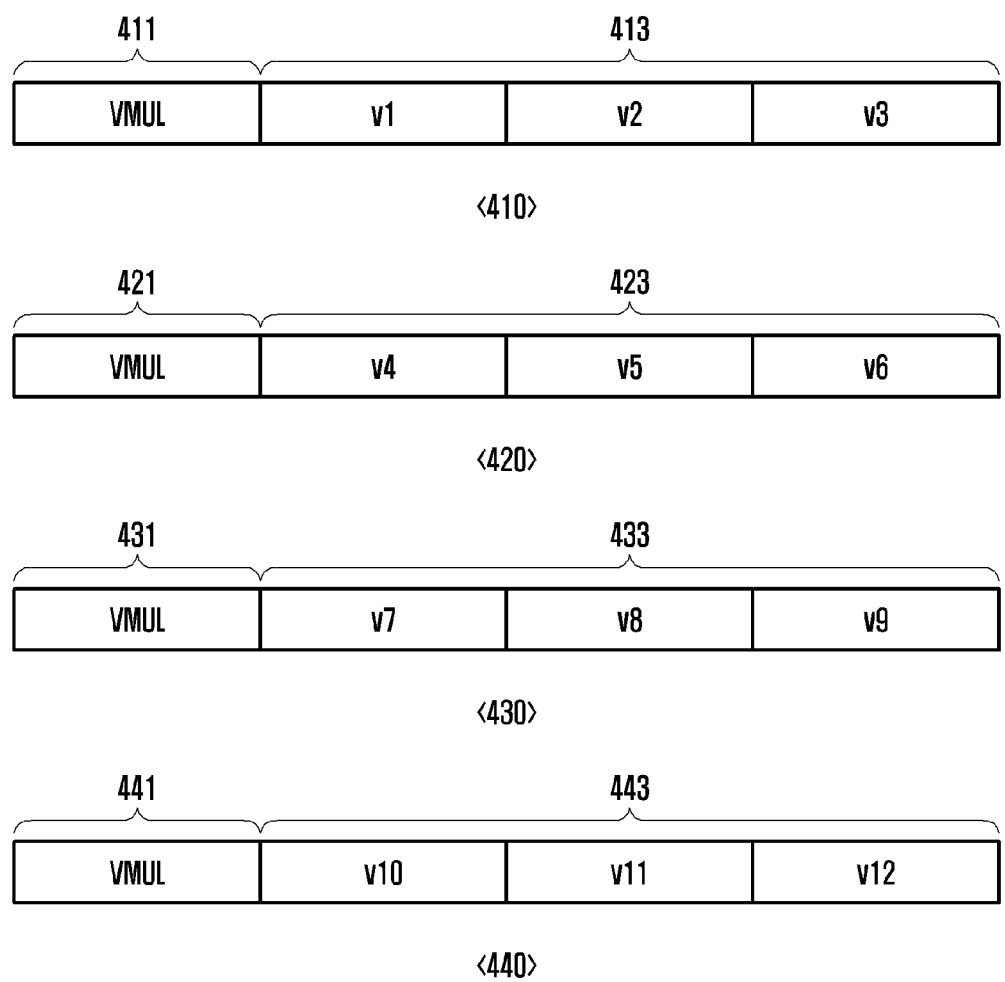
FIG. 4A illustrates a diagram showing an instruction set architecture (ISA) for "VMUL v1, v2, v3," "VMUL v4, v5, v6," "VMUL v7, v8, v9," and "VMUL v10, v11, v12" in the generated assembly code according to embodiments of the inventive concepts.
Figure 4B:
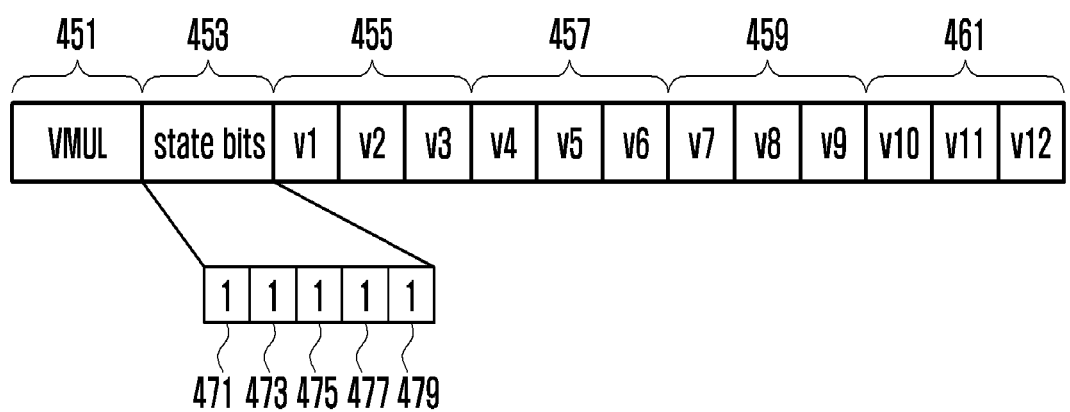
FIG. 4B illustrates a diagram showing first to fourth slots according to embodiments of the inventive concepts.

FIGS. 4A and 4B illustrate diagrams of a method of generating and decoding an instruction code according to embodiments of the inventive concepts.

In an embodiment, a processor (e.g., the processor 210 of FIG. 2) may repeatedly perform the same operations (e.g., vmul, vadd, mul, and add) in an operation application. For example, the processor may repeatedly perform the same operations in a for-statement of a C-code, as shown in Table 1 below.

TABLE 1

```
for(int z = 0 ; z < Max ; z++ )
    {
        int V a,b,c,d,e,f,g,h,i,j,k,l,m,n,o,p,q,r,s,t,u,v,w,x;
        a = b*c; d = e*f; g = h*i; j = k*l;
        m = n+ o; p = q+ r; s = t+ u; v = w+ x;
        a = a*n; d = d*q; g = g*t; j = j-w;
        m = m+ b; p = p+ e; s = s-h; v = v+ k;
        ...
    }
```

In an embodiment, the operation such as the above-described Table 1 may process vector-type data by a scheme of simultaneously calculating a plurality of pieces of data with a single command (e.g., single instruction multiple data (SIMD)). For example, the processor may perform a vector data multiplication process on an opcode VMUL in the SIMD scheme.

In an embodiment, the above description assumes that the vector-type data is processed, but the inventive concepts are not limited thereto. A scalar instruction may also be processed in the above-described SIMD scheme.

In an embodiment, when two or more slots constituting the ISA have the same opcodes, the processor may process instructions having the same opcode at the same time. For example, when the same opcode is allocated to two or more slots on the basis of one clock cycle, the processor may generate an assembly code as shown in Table 2 below.

TABLE 2

VMUL v1, v2, v3. VMUL v4, v5, v6. VMUL v7, v8, v9. VMUL v10, v11, v12 VADD v13, v14, v15. VADD v16, v17, v18. VADD v19, v20, v21. VADD v22, v23, v24 VMUL v1, v1, v14. VMUL v4, v4, v17. VMUL v7, v7, v20. VSUB v10, v10, v23 VADD v13, v13, v2. VADD v16, v16, v5. VSUB v19, v19, v8. VADD v22, v22, v11

FIG. 4A illustrates an instruction set architecture (ISA) for "VMUL v1, v2, v3," "VMUL v4, v5, v6," "VMUL v7, v8, v9," and "VMUL v10, v11, v12" in the generated assembly code.

Referring to FIG. 4A, a first slot 410 is composed of an opcode VMUL 411 and register index fields v1, v2, and v3 413, a second slot 420 is composed of an opcode VMUL 421 and register index fields v4, v5, and v6 423, a third slot 430 is composed of an opcode VMUL 431 and register index fields v7, v8, and v9 433, and a fourth slot 440 is composed of an opcode VMUL 441 and register index fields v10, v11, and v12 443.

In the ISA shown in FIG. 4A, the processor (e.g., processor 210 of FIG. 2) determines that the four slots 410 to 440 use the same opcode VMUL. When it is determined that the same opcode VMUL is used, the processor may generate a new instruction code (e.g., a new VLIW instruction) such as shown in <450> of FIG. 4B composed of the same opcode VMUL 451 of the first to four slots 410 to 440, register index fields in which the opcode (e.g., VMUL 451) is to be used in the first to fourth slots 410 to 440 (e.g., v1, v2, and v3 455; v4, v5, and v6 457; v7, v8, and v9 459, and v10, v11, and v12 461), and state bits 453. The same opcode VMUL 451 may be characterized as corresponding to the opcode constituting or set for the new instruction code. As shown in FIG. 4B, the new instruction code includes a single occurrence of the same opcode VMUL 451.

In an embodiment, the state bits 453 may be composed of a field indicating whether an instruction code is new, and a field indicating whether the opcode 451 is the same as the opcodes of the register index fields. For example, the state bits 453 may consist of 5 bits, i.e., one bit 471 for determining whether an instruction code is new, and four bits 473, 475, 477, and 479 of the fields indicating whether the opcode 451 (i.e., the opcode constituting or set for the new instruction code) is the same as the opcodes of the register index fields.

As an example, in the embodiment shown in FIG. 4B, field values constituting the state bits 453 are 1 (471), 1 (473), 1 (475), 1 (477), and 1 (479). The value indicating whether the instruction code is new is the state bit 471 from among the field values constituting the state bits 453, and in this example is 1 (471). For example, when the value of the state bit 471 indicating whether an instruction code is new is 1, the processor may determine that the instruction code is new. On the other hand, when the value of the state bit 471 indicating whether an instruction code is new is 0, the processor may determine that the instruction code is not new. However, in other embodiments, when the value of the state bit 471 for indicating whether an instruction code is new is 0 the processor may determine that the instruction code is new, and when the value of the state bit 471 for indicating whether an instruction code is new is 1 the processor may determine that the instruction code is not new.

In an embodiment shown in FIG. 4B, each of 1 (473), 1 (475), 1 (477), and 1 (479) of the field values constituting the state bits 453 may be a value indicating whether the opcodes of the register index fields 455, 457, 459, and 461 are the same as the opcode 451 (i.e., the opcode constituting or set for the new instruction code). For example, when the values of the state bits corresponding to the register index fields are 1, the processor may determine that the opcodes of the register index fields are the same as the opcode 451. On the other hand, when the values of the state bits corresponding to the register index fields are 0, the processor may determine that the opcodes of the register index fields are different from the opcode 451. However, in other embodiments, when the values of the state bits corresponding to the register index fields are 0 the processor may determine that the opcodes of the register index fields are the same as the opcode 451, and when the values of the state bits corresponding to the register index fields are 1 the processor may determine that the opcodes of the register index fields are different from the opcode 451.

In an embodiment, the state bits 453 may consist of only 1 bit indicating whether an instruction code is new.

Conventionally, when four 32-bit slots having the same opcode are all used, a 128-bit program memory (e.g., the program memory 231 of FIG. 2) has been used.

In an embodiment of the inventive concepts, as a new instruction code such as shown in FIG. 4B is generated, a program memory to be used may have a total of 82 (or 78) bits, i.e., 32 bits for the opcode VMUL 451 and the register index fields v1, v2, and v3 455, 15 bits for the register index fields v4, v5, and v6 457, 15 bits for the register index fields v7, v8, and v9 459, 15 bits for the register index fields v10, v11, and v12 461, and 5 bits (or 1 bit) for the state bits 453.

In an embodiment, when the four slots use the same opcode, the new instruction code consists of 82 bits (or 78 bits), and thus can be composed of three slots. Thus, it is possible to reduce the size of the program memory by 25% compared to a conventional case.

In an embodiment, the above description assumes that the register index field consists of five bits, but the inventive concepts are not limited thereto. Accordingly, the register index field may consist of four bits.

In an embodiment, when an instruction code is decoded, the processor may fetch the instruction code from a memory (e.g., the memory 230 of FIG. 2).

In an embodiment, the processor may check state bits of the fetched instruction code in order to determine whether the fetched instruction code is a new instruction code generated on the basis of a same opcode.

For example, as may be understood in view of FIG. 4B, the processor may check the state bits 453 included in the instruction code 450 in order to determine whether the fetched instruction code 450 is a new instruction code. Since a value of the state bit 471 indicating whether the fetched instruction code 450 is a new instruction code is 1 (471), the processor may determine that the fetched instruction code 450 is a new instruction code generated on the basis of a same opcode.

In an embodiment, for example the spreading logic 213 of the processor 210 may spread the same opcode, VMUL 451 (i.e., the opcode constituting or set for the new instruction code) into slots in which the state bits 453 are activated, for example, the register index fields 455, 457, 459, and 461 corresponding to 1 (473), 1 (475), 1 (477), and 1 (479) of the state bits 453. In other words, the spreading logic 213 may distribute or copy the opcode VMUL 451 of the fetched instruction code 450 of FIG. 4B into the corresponding slots based on the state bits 473, 475, 477 and 479.

In an embodiment, the processor may decode the instruction on the basis of the spread opcode VMUL 451. For example, the processor may spread the opcode 451 into the slots in which the state bits 453 are activated and may process each of the register index fields 455, 457, 459, and 461 using the opcode VMUL 451.

In an embodiment, the processor may spread the opcode 451 into the slots in which the state bits 453 are activated and may perform restoration in the form of an ISA (e.g., including the opcodes, the two operand register index fields, and the register index field for storing result values) shown in FIG. 4A and process the instruction.

Figure 5B:
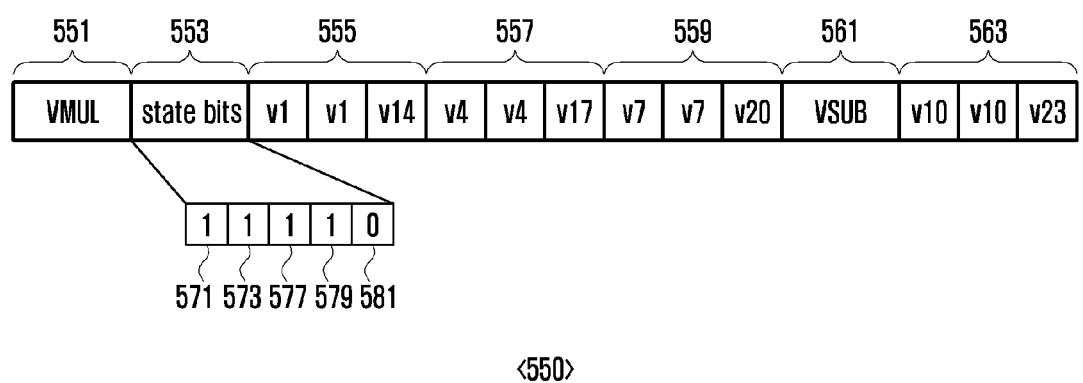
FIG. 5B illustrates a diagram descriptive of a method of generating and decoding an instruction code according to embodiments of the inventive concepts.

FIGS. 5A and 5B illustrate diagrams descriptive of a method of generating and decoding an instruction code according to embodiments of the inventive concepts.

FIG. 5A shows an ISA for "VMUL v1, v1, v14," "VMUL v4, v4, v17," "VMUL v7, v7, v20," and "VSUB v10, v10, v23" in the assembly code generated in the above Table 2.

Referring to FIG. 5A, a first slot 510 may be composed of an opcode VMUL 511 and register index fields v1, v1, and v14 513, a second slot 520 may be composed of an opcode VMUL 521 and register index fields v4, v4, and v17 523, a third slot 530 may be composed of an opcode VMUL 531 and register index fields v7, v7, and v20 533, and a fourth slot 540 may be composed of an opcode VSUB 541 and register index fields v10, v10, and v23 543.

In the ISA shown in FIG. 5A, the processor (e.g., the processor 210 of FIG. 2) may determine that one or more of the four slots 510 to 540, for example, the first to third slots 510 to 530 use the same opcode VMUL.

In an embodiment, when it is determined that two or more slots use the same opcode VMUL, the processor may generate a new instruction code (e.g., a new VLIW instruction) such as shown in <550> of FIG. 5B composed of the same opcode VMUL 551 of the first slot 510, the second slot 520, and the third slot 530, register index fields in which the opcode (e.g., VMUL 551) is to be used in the first slot 510, the second slot 520, and the third slot 530 respectively (e.g., v1, v1, and v14 555; v4, v4, and v17 557; and v7, v7, and v20 559), an opcode VSUB 561 of the fourth slot 540, register index fields (v10, v10, and v23 563) in which the opcode is to be used in the fourth slot 540, and state bits 553. The same opcode VMUL 551 in this case may be characterized as corresponding to the opcode constituting or set for the new instruction code.

In an embodiment, the state bits 553 may be composed of a field indicating whether an instruction code is new, and a field indicating whether the opcode 551 is the same as the opcodes of the register index fields. For example, the state bits 553 may consist of 5 bits, i.e., one bit 571 for determining whether an instruction code is new, and four bits 573, 577, 579, and 581 of the fields indicating whether the opcode 551 is the same as the opcodes of the corresponding register index fields.

In an embodiment, the state bits 553 may consist of only 1 bit indicating whether an instruction code is new.

Conventionally, when four 32-bit slots are all used, a 128-bit program memory (e.g., the program memory 231 of FIG. 2) has been used.

In an embodiment, as a new instruction code such as shown in FIG. 5B is generated, a program memory to be used may have a total of 99 (or 95) bits, i.e., 32 bits for the opcode VMUL 551 and the register index fields v1, v1, and v14 555, 15 bits for the register index fields v4, v4, and v17 557, 15 bits for the register index fields v7, v7, and v20 559, 32 bits for the opcode VSUB 561 and the register index fields v10, v10, and v23 563, and 5 bits (or 1 bit) for the state bits 553.

In an embodiment, the new instruction code 550 consists of 99 bits (or 95 bits). Thus, it is possible to reduce the size of the program memory by 25% compared to a conventional case in which the program memory uses 128 bits.

In an embodiment, when the instruction code is decoded, the processor may fetch the instruction code from a memory (e.g., the memory 230 of FIG. 2).

In an embodiment, the processor may check a state bit of the fetched instruction code in order to determine whether the fetched instruction code is a new instruction code generated on the basis of a same opcode.

For example, the processor may check the state bits 553 included in the instruction code 550 in order to determine whether the fetched instruction code 550 is a new instruction code. Since the value of the state bit 571 indicating whether the instruction code is new is 1 (571), the processor may determine that the fetched instruction code 550 is a new instruction code generated on the basis of a same opcode.

In an embodiment, for example the spreading logic 213 of the processor 210 may spread the same opcode VMUL 551 (i.e., the opcode constituting or set for the new instruction code) into slots in which the state bits 553 are activated, for example, the register index fields 555, 557, and 559 corresponding to 1 (573), 1 (577), and 1 (579) of the state bits 553, as shown in FIG. 5B. In other words, the spreading logic 213 of the processor 210 may distribute or copy opcode VMUL 551 of the fetched instruction code 550 into the corresponding slots based on the state bits 573, 577 and 579.

In an embodiment, for example as shown in FIG. 5B, a slot in which the state bit 581 is 0 is deactivated, and the register index field 563 corresponding to 0 (581) may have a different opcode (e.g., VSUB 561) from the opcode VMUL 551. In this case, the processor may not perform spreading. That is, the opcode VMUL 551 is not distributed or copied to the slot corresponding to state bit 581.

In an embodiment, the processor may decode the instruction on the basis of the spread opcode 551. For example, by spreading the opcode 551 into the slots in which the state bits 553 are activated, the processor may process the register index fields 555, 557, and 559 using the opcode VMUL 551, and may process the register index field 563 using the opcode VSUB 561.

In an embodiment, the processor (e.g., processor 210 of FIG. 2) may spread the opcode 551 into the slots in which the state bits 553 are activated and may perform restoration in the form of an ISA (e.g., including the opcodes, the two operand register index fields, and the register index field for storing result values) shown in FIG. 5A and process the instruction.

Figure 6:
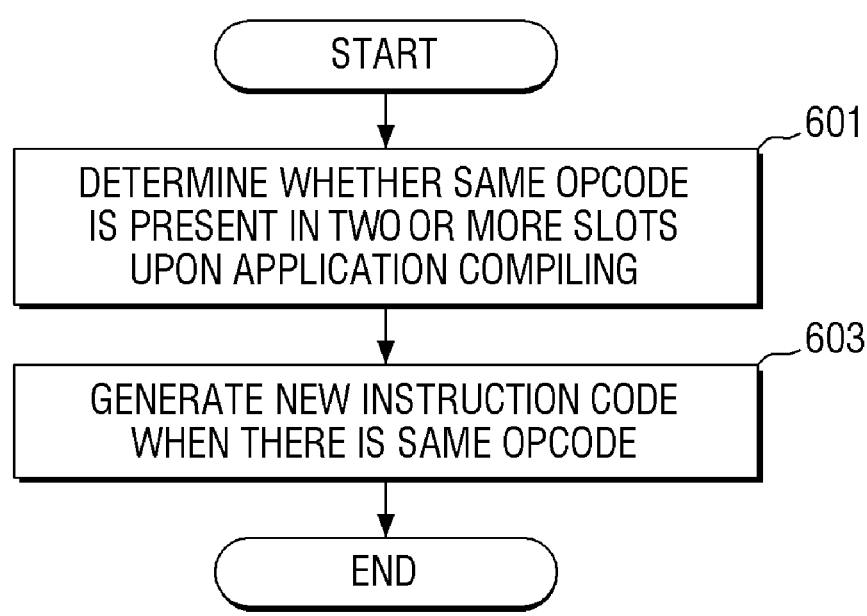
FIG. 6 illustrates a flowchart of a method of generating an instruction code according to embodiments of the inventive concepts.

FIG. 6 illustrates a flowchart of a method of generating an instruction code according to embodiments of the inventive concepts.

Referring to FIG. 6, a processor (e.g., the processor 210 of FIG. 2) determines whether two or more slots constituting an ISA have the same opcode upon application compiling in operation 601. For example, the opcode may include arithmetic operations (e.g., VMUL, VADD, VSUB, MUL, ADD, SUB) and logical operations (e.g., AND, OR, NOT).

In an embodiment, when the two or more slots have the same opcode, the processor generates a new instruction code on the basis of the same opcode in operation 603. For example, the generated new instruction code may be composed of an opcode and register index fields of one of the slots having the same opcode, at least one register index field of at least one of the slots having the same opcode other than (i.e., excluding) the one slot, and state bits. In this case, the same opcode may be characterized as corresponding to an opcode constituting or set for the new instruction code, and in some cases a same first opcode.

In an embodiment, the state bits may be composed of a field indicating whether an instruction code is generated on the basis of a same opcode (i.e., an opcode constituting or set for the new instruction code), and a field indicating whether the opcodes of the register index fields constituting the one or more slots are the same as the opcode constituting or set for the new instruction code.

Figure 7:
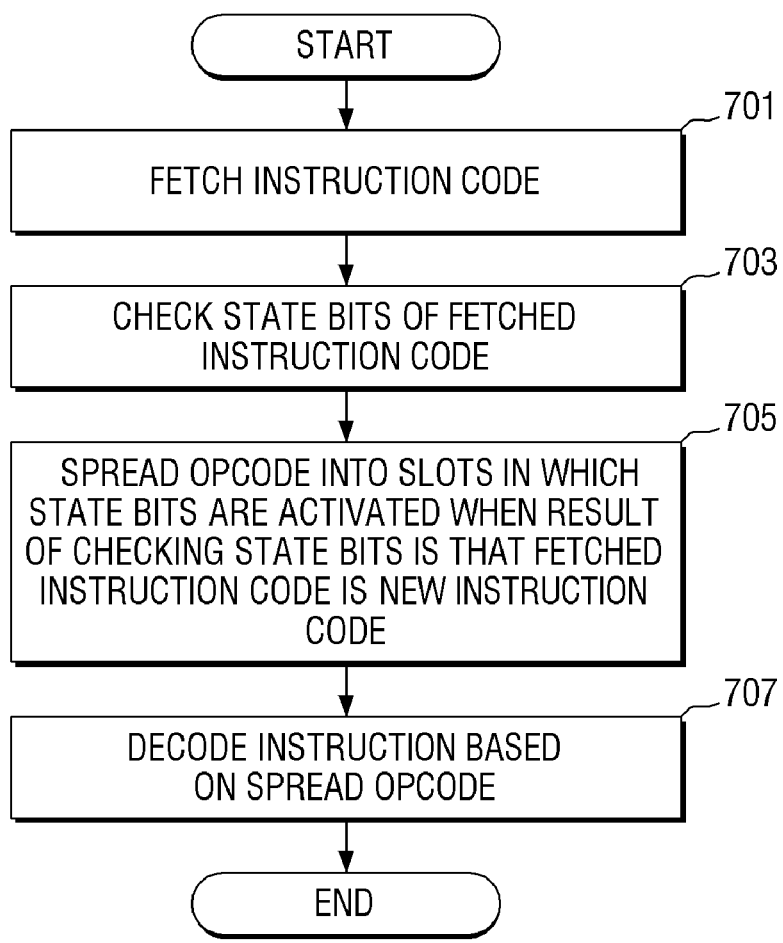
FIG. 7 illustrates a flowchart of a method of decoding a new instruction code according to embodiments of the inventive concepts.

FIG. 7 illustrates a flowchart of a method of decoding a new instruction code according to embodiments of the inventive concepts.

Referring to FIG. 7, a processor (e.g., the processor 210 of FIG. 2) fetches an instruction code in operation 701.

In an embodiment, the processor checks state bits of the fetched instruction code in operation 703. For example, the processor may check the state bits included in the fetched instruction code and may determine whether the fetched instruction code is a new instruction code.

In an embodiment, the state bits may be composed of a field indicating whether the fetched instruction code is generated on the basis of a same opcode (i.e., an opcode constituting or set for the fetched instruction code), and a field indicating whether the opcodes of the register index fields constituting the one or more slots are the same as the opcode constituting or set for the fetched instruction code. In this embodiment, determining that the fetched instruction code is generated on the basis of a same opcode may be considered equivalent to determining that the fetched instruction code is new.

In an embodiment, when a value of a state bit indicating whether an instruction code is new is 1, the processor determines that the instruction code is new. Alternatively, when a value of a state bit indicating whether an instruction code is new is 0, the processor determines that the instruction code is not new.

In an embodiment, when the values of the state bits corresponding to the register index fields are 1, the processor determines that the opcodes of the register index fields are the same as the opcode (i.e., the opcode constituting or set for the fetched instruction code). Alternatively, when the values of the state bits corresponding to the register index fields are 0, the processor determines that the opcodes of the register index fields are different from the opcode.

In an embodiment, when the processor determines that the fetched instruction code is a new instruction code by checking the state bits of the fetched instruction code, the processor spreads the opcode into slots in which the state bits are activated in operation 705.

In an embodiment, the processor decodes the instruction on the basis of the spread opcode in operation 707. For example, the processor may process an instruction of a corresponding index field using the spread opcode.

In an embodiment, the processor may spread the opcode into the slots in which the state bits are activated and may perform restoration in the form of an ISA (e.g., including the opcodes, the two operand register index fields, and the register index field for storing result values) shown in FIG. 3 and process the instruction.

In the embodiments shown in FIGS. 4A to 5B, the above description assumes that three pieces of vector data are included, but the inventive concepts are not limited thereto. One or two pieces of vector data may be included. In this case, when the restoration is made in the ISA shown in FIG. 3, vector data is decoded in a corresponding one of the three register index fields, and no operation (nop) may be inserted into the other register index fields. Under the control of the processor, the instruction processing may not be performed on the register index fields into which the nop is inserted. Thus, it is possible to minimize complexity in terms of hardware without defining a plurality of ISAs (e.g., a slot having one register index field and a slot having two register index fields).

With the electronic device according to various embodiments of the inventive concepts, it is possible to generate a new VLIW instruction to reduce redundancy of using the same opcode when the same opcode is used in one or more slots in a VLIW processor. As the new VLIW instruction is generated, it is possible to reduce the size of the program memory. Also, since the size of the program memory is reduced, it is possible to reduce the number of times of fetching instructions and reduce the cache miss rate, as well as reduce chip costs. Thus, it is possible to improve processor performance of an electronic device according to various embodiments of the inventive concepts.

What is claimed is:

1. An electronic device comprising:
   a memory; and
   a processor configured to determine whether two or more slots from among a plurality of slots of an execution unit of an instruction configured according to an instruction set architecture (ISA) have a same first opcode upon application compiling, and
   when the two or more slots have the same first opcode, the processor is further configured to generate an instruction code composed of the same first opcode and register index fields of one of the plurality of slots having the same first opcode, at least one register index field of at least another one of the plurality of slots having the same first opcode, and state bits, and to store the instruction code in the memory,
   wherein the state bits comprise a field including a plurality of bits equal in number to a number of the plurality of slots, and
   wherein a first bit from among the plurality of bits indicates whether an opcode of a first slot from among the plurality of slots is the same as the same first opcode, and a second bit from among the plurality of bits indicates whether an opcode of a second slot from among the plurality of slots is the same as the same first opcode.

2. The electronic device of claim 1, wherein the state bits further comprise a field indicating whether the instruction code is new.

3. The electronic device of claim 1, wherein the processor is configured to fetch an instruction code from the memory, and determine whether the fetched instruction code is generated based on a same second opcode on a basis of state bits of the fetched instruction code.

4. The electronic device of claim 3, wherein when the fetched instruction code is generated based on the same second opcode, the processor is configured to check a value corresponding to at least one register index field from among fields of the state bits of the fetched instruction code, spread the same second opcode into a slot in which the value corresponding to the at least one register index field is activated, and decode the fetched instruction code generated based on the spread same second opcode.

5. The electronic device of claim 4, wherein after spreading the same second opcode, the processor is configured to decode the fetched instruction code in the instruction set architecture defined in the memory.

6. The electronic device of claim 1, wherein the processor is a very long instruction word (VLIW) processor comprised of a plurality of decoders equal in number to the plurality of the slots.

7. A method of processing an instruction of an electronic device comprising a memory and a processor, the method comprising:
   determining by the processor whether two or more slots from among a plurality of slots of an execution unit of an instruction configured according to an instruction set architecture (ISA) stored in the memory have a same first opcode upon application compiling; and
   when the two or more slots have the same first opcode, generating by the processor an instruction code composed of the same first opcode and register index fields of one of the plurality of slots having the same first opcode, at least one register index field of at least another one of the slots having the same first opcode, and state bits, and storing the instruction code in the memory,
   wherein the state bits comprise a field including a plurality of bits equal in number to a number of the plurality of slots, and
   wherein a first bit from among the plurality of bits indicates whether an opcode of a first slot from among the plurality of slots is the same as the same first opcode, and a second bit from among the plurality of bits indicates whether an opcode of a second slot from among the plurality of slots is the same as the same first opcode.

8. The method of claim 7, wherein the state bits further comprise a field indicating whether the instruction code is new.

9. The method of claim 7, further comprising:
   fetching by the processor an instruction code from the memory; and
   determining by the processor whether the fetched instruction code is generated based on a same second opcode on a basis of state bits of the fetched instruction code.

10. The method of claim 9, further comprising:
    checking by the processor a value corresponding to at least one register index field from among fields of the state bits of the fetched instruction code when the fetched instruction code is generated based on the same second opcode;
    spreading by the processor the same second opcode into a slot in which the value corresponding to the at least one register index field is activated; and
    decoding by the processor the fetched instruction code based on the same second opcode on a basis of said spreading.

11. The method of claim 10, wherein the decoding of the fetched instruction code comprises decoding the fetched instruction code in the instruction set architecture defined in the memory after said spreading.

12. An electronic device comprising:
    a memory configured to store an instruction set architecture (ISA); and
    a processor configured to determine whether two or more slots from among a plurality of slots of an execution unit of an instruction configured according to the instruction set architecture (ISA) have a same first opcode upon application compiling, wherein each of the plurality of slots comprise an opcode field and register index fields, and
    when the two or more slots have the same first opcode, the processor is further configured to generate an instruction code including a single occurrence of the same first opcode, the register index fields of the two or more slots, and state bits,
    wherein the state bits comprise a field including a plurality of bits equal in number to a number of the plurality of slots, and
    wherein a first bit from among the plurality of bits indicates whether an opcode of a first slot from among the plurality of slots is the same as the same first opcode, and a second bit from among the plurality of bits indicates whether an opcode of a second slot from among the plurality of slots is the same as the same first opcode.

13. The electronic device of claim 12, wherein the execution unit of the instruction further comprises an additional slot comprising an additional opcode and additional register index fields, the additional opcode different than the same first opcode,
    wherein the processor is further configured to generate the instruction code as including the additional opcode and the additional register index fields.

14. The electronic device of claim 12, wherein the state bits further comprise a field indicating whether the instruction code is new.

15. The electronic device of claim 12, wherein the processor is configured to fetch an instruction code from the memory, and determine whether the fetched instruction code is generated based on a same second opcode on a basis of state bits of the fetched instruction code.

16. The electronic device of claim 15, wherein when the fetched instruction code is generated based on the same second opcode, the processor is configured to check a value corresponding to at least one register index field from among fields of the state bits of the fetched instruction code, spread the same second opcode into a slot in which the value corresponding to the at least one register index field is activated, and decode the fetched instruction code generated based on the spread same second opcode.

17. The electronic device of claim 16, wherein after spreading the same second opcode, the processor is configured to decode the fetched instruction code in the instruction set architecture defined in the memory.

18. The electronic device of claim 12, wherein the processor is a very long instruction word (VLIW) processor comprised of a plurality of decoders equal in number to the plurality of the slots.

* * * * *